US012780639B2

(12) United States Patent
Clausen et al.

(10) Patent No.: US 12,780,639 B2
(45) Date of Patent: Nov. 3, 2026

(54) CONTAINER TREATMENT SYSTEM

(71) Applicant: KRONES AG, Neutraubling (DE)

(72) Inventors: Niels Clausen, Dollerup (DE); Jens Luecke, Flensburg (DE); Christian Depner, Silberstedt (DE)

(73) Assignee: KRONES AG, Neutraubling (DE)

(*) Notice: Subject to any disclaimer, the term of this patent is extended or adjusted under 35 U.S.C. 154(b) by 0 days.

(21) Appl. No.: 18/855,622

(22) PCT Filed: Mar. 28, 2023

(86) PCT No.: PCT/EP2023/057930

§ 371 (c)(1),
(2) Date: Oct. 9, 2024

(87) PCT Pub. No.: WO2023/198441

PCT Pub. Date: Oct. 19, 2023

(65) Prior Publication Data

US 2025/0250152 A1 Aug. 7, 2025

(30) Foreign Application Priority Data

Apr. 11, 2022 (DE) ..................... 10 2022 108 753.0

(51) Int. Cl.
*B67C 7/00* (2006.01)
*B67C 3/00* (2006.01)

(52) U.S. Cl.
CPC .............. *B67C 7/002* (2013.01); *B67C 3/007* (2013.01); *B67C 7/0026* (2013.01); *B67C 7/0073* (2013.01)

(58) Field of Classification Search
CPC .. B67C 3/00; B67C 3/007; B67C 7/00; B67C 7/002; B67C 7/0026; B67C 7/0073
See application file for complete search history.

(56) References Cited

U.S. PATENT DOCUMENTS 9,809,392 B2 * 11/2017 Walter .................. B65G 43/10
10,167,143 B2 * 1/2019 Senn ...................... B65G 37/02
(Continued)

FOREIGN PATENT DOCUMENTS

| | | | |
|---|---|---|---|
| CN | 102372162 | A | 3/2012 |
| CN | 209467424 | U | 10/2019 |
| DE | 102004053663 | A1 | 8/2005 |
| DE | 102021110009 | A1 | 10/2022 |

OTHER PUBLICATIONS

Manger, H., "Füllanlagen für Getränke—Ein Kompendium zur Reinigungs-, Füll- und Verpackungstechnik für Einweg- und Mehrwegflaschen, Dosen, Fässer und Kegs," Versuchs- und Lehranstalt für Brauerei, 1st Edition, Berlin, Germany, Nov. 12, 2008, 37 pages. (Submitted with Partial English Translation).
(Continued)

*Primary Examiner* — Nicolas A Arnett
(74) *Attorney, Agent, or Firm* — McCoy Russell LLP

(57) ABSTRACT

Disclosed is a container treatment system for treating containers comprising a first treatment block with a first single-line container exit point, further comprising a downstream second treatment block having a wet region and/or temperature control region with a mass conveyor for containers, a first single-line container feed point upstream of the mass conveyor and a second single-line container exit point downstream of the mass conveyor, and comprising a third treatment block that is located downstream of the second treatment block and has a second single-line container feed point, wherein the first single-line container exit point of the first treatment block is connected to the first single-line container feed point of the second treatment block via a first single-line conveying device, and the second single-line container exit point of the second treatment block is connected to the second single-line container feed point of the third treatment block.

14 Claims, 3 Drawing Sheets

(56) References Cited

U.S. PATENT DOCUMENTS

| | | | | |
|---|---|---|---|---|
| 10,766,650 | B2 * | 9/2020 | Choplin | B65G 47/32 |
| 11,511,946 | B2 * | 11/2022 | Gehin | B65G 47/82 |
| 12,269,693 | B2 * | 4/2025 | Senn | B65G 47/53 |
| 2007/0101681 | A1 * | 5/2007 | Iwashita | B67C 3/04<br>53/425 |
| 2013/0310969 | A1 * | 11/2013 | Terzini | G06Q 10/087<br>700/235 |
| 2014/0311861 | A1 * | 10/2014 | Hausladen | B07C 5/3412<br>198/434 |
| 2016/0340129 | A1 * | 11/2016 | Beesley | B65G 15/12 |
| 2023/0132939 | A1 * | 5/2023 | Bianchini | B08B 9/08<br>53/473 |
| 2024/0199401 | A1 * | 6/2024 | Winzinger | B65C 9/40 |
| 2025/0276886 | A1 * | 9/2025 | Clausen | B67C 7/002 |

FOREIGN PATENT DOCUMENTS

| | | | |
|---|---|---|---|
| EP | 2380832 | A1 | 10/2011 |
| EP | 2851334 | A1 | 3/2015 |
| EP | 3822185 | A1 | 5/2021 |
| WO | 2012013255 | A1 | 2/2012 |

OTHER PUBLICATIONS

ISA European Patent Office, International Search Report Issued in Application No. PCT/EP2023/057930, Jul. 17, 2023, WIPO, 4 pages.

China National Intellectual Property Administration, Office Action and Search Report Issued in Application No. 202380033382.5, Aug. 25, 2026, 19 pages.

* cited by examiner

CONTAINER TREATMENT SYSTEM

CROSS REFERENCE TO RELATED APPLICATIONS

The present application is a U.S. National Phase of International Application No. PCT/EP2023/057930 entitled "CONTAINER TREATMENT SYSTEM," and filed on Mar. 28, 2023. International Application No. PCT/EP2023/057930 claims priority to German Patent Application No. 10 2022 108 753.0 filed on Apr. 11, 2022. The entire contents of each of the above-listed applications are hereby incorporated by reference for all purposes.

TECHNICAL FIELD

The present invention relates to a container treatment system according to independent claim 1 and an assortment of container treatment systems according to claim 12 as well as a method for treating containers, such as bottles, according to claim 14.

BACKGROUND AND SUMMARY

Container treatment systems, in particular block-based container treatment systems, are already known from the prior art. In this case, various container treatment machines, for example a filler and a capper and a downstream pasteurizer as well as a downstream decoration device such as a printing machine or a labeling machine, are usually operated at least partially synchronized so that the containers are continuously conveyed through the system and treated in the process. Conveying devices are arranged between the individual container treatment machines of a container treatment system. In order to catch any failures of individual container handling machines without having to stop the container handling machines arranged upstream or downstream or without adversely affecting their operation, extensive buffer systems are provided in the conveying devices arranged between the machines. These can accommodate a large number of containers and therefore at least partially maintain the operation of the container treatment system, for example in the event of a failure of a downstream container treatment machine or in the event of a failure of an upstream container treatment machine.

For this purpose, the buffer systems must be large enough to provide sufficient buffer capacity at a typical throughput rate of several thousand or several tens of thousands of containers per hour in order to avoid the adverse effects of a production interruption in a system described above.

This entails considerable space requirements as well as restrictions regarding the positioning of the container handling machines relative to each other, since the buffer systems have to be provided in between them.

Object

On the basis of the known prior art, the technical object to be achieved is to basically maintain the operation of a container treatment system with a plurality of container treatment machines even in the event of a failure of the individual container treatment machines, while keeping space requirements as low as possible.

Solution

This object is achieved according to the invention by the container treatment system according to independent claim

1 as well as the assortment of container treatment systems according to claim 12 and the method for treating containers according to claim 14. Advantageous developments of the invention are disclosed in the dependent claims.

The container treatment system according to the invention for treating containers such as bottles comprises a first treatment block with a first single-line container exit point, a second treatment block arranged downstream comprising a wet region and/or temperature control region with a mass conveyor for containers, a first single-line container feed point upstream from the mass conveyor, and a second single-line container exit point downstream from the mass conveyor, and a third treatment block arranged downstream from the second treatment block with a second single-line container feed point, wherein the single-line container exit point of the first treatment block is connected to the single-line container feed point of the second treatment block by a first single-line conveying device, and the single-line container exit point of the second treatment block is connected to the single-line container feed point of the third treatment block by a second single-line conveying device.

The invention is not limited to exactly one single-line container exit point or container feed point in the respective treatment blocks. A plurality (for example two, three or more) of single-line container exit points and/or single-line container feed points can thus be provided for respective treatment blocks, which can be arranged horizontally and/or vertically offset from one another.

Within the scope of the invention, a treatment block is understood to mean an arrangement of at least one, but possibly also a plurality of, container treatment machines which carry out a treatment of containers jointly or in isolation and are not separated from one another by the first or second single-line conveying device. In particular, within a treatment block, transportation can be effected by means of other conveying devices, in particular transport stars. Preferably, the throughput rate of the container treatment machines within a treatment block, is the same and/or the operation of the container treatment machines of a treatment block is synchronized so that the same number of containers are treated per unit of time by each container treatment machine of a treatment block.

The mass conveyor of the wet region and/or temperature control region is to be understood as a conveying device in which the containers are transported essentially in an unordered manner.

In contrast to the mass conveyor, a single-line conveying device is understood to be a conveying device (such as a conveyor belt or air conveyor) in which containers can only be transported in exactly one line, i.e., one container after the other.

A wet region and/or temperature control region is also understood to mean any device that either heats and/or cools the containers and/or applies a liquid thereto. These include in particular pasteurizers and washing machines for containers.

According to the invention, the mass conveyor or a part of the mass conveyor is advantageously used as a buffer region, since a large number of containers can be transported in this mass conveyor. This means that additional buffer apparatuses downstream or upstream from the second treatment block can be eschewed, which reduces the space requirements for the conveying devices between the treatment blocks and therefore the container treatment system as a whole. In particular, this not only allows space to be saved but also advantageously allows a flexible arrangement of the treatment blocks relative to each other by appropriate settings or a design of the first and second single-line conveying devices. Single-line transport systems are more flexible in terms of their spatial arrangement and space requirements than buffer regions which must meet a specified buffer capacity (number of containers that can be accommodated).

This means that changing space requirements, such as for different customers, can be taken into account, although the design of the individual treatment blocks can always remain the same.

In one embodiment, the wet region and/or temperature control region is designed as a pasteurizer, and/or the second treatment block comprises a blower for blowing off liquid on the surface of the containers.

Since in a pasteurizer the containers are usually transported in a mass flow; this is particularly suitable for achieving the necessary buffering effect. It can further be provided that a region is arranged at the inlet and/or outlet of the pasteurizer in which containers can be buffered in an unordered manner after they have left the pasteurizer or before they are fed thereto. This can prevent containers from remaining in the pasteurizer for too long, even given a large buffering requirement.

Furthermore, it can be provided that the first single-line container exit point, the first single-line conveying device and the first single-line container feed point are designed for the single-line transportation of containers in at least two vertical transport routes; and/or that the second single-line container exit point, the second single-line conveying device and the second single-line container feed point are designed for the single-line transportation of containers in at least two vertical transport routes.

This design increases the throughput rate of the container treatment system and in particular the transport capacity of containers between the individual treatment blocks. It can be provided that a device for overcoming height is assigned to the treatment blocks at the inlet and/or outlet so that the containers transported in different vertical transport routes are brought back to a height level before they are fed to a treatment machine of the respective treatment block or are distributed over two different height levels in order to be fed to the respective transport routes after leaving the treatment block at the outlet. In particular, the second treatment block can comprise a mass conveyor which allows a treatment of containers at two height levels corresponding to the vertical transport routes so that a device for overcoming the height is not required in this region.

In one embodiment, it is provided that the first treatment block comprises a filler, and/or a capper, and/or an inspection device for inspecting the containers.

These devices can advantageously be arranged outside a treatment block that includes a wet region and can therefore continue to operate even if, for example, the third treatment block fails, since buffering of the containers is realized in between them.

Furthermore, it can be provided that the third treatment block downstream from the second container feed point comprises a lane divider for dividing the containers from the second single-line conveying device into a plurality of lanes, and/or wherein the third treatment block comprises an inspection device for inspecting the containers, and/or wherein the third treatment block comprises a labeling machine and/or a direct printing machine.

By division of the lanes, the throughput rate of the third treatment block can be increased. Since the further treatment of the containers following a pasteurization is usually not time-critical (i.e., a certain standing time of the containers before this treatment is also possible without adversely affecting the containers), labeling machines or direct printing machines that are designed to decorate the containers can advantageously be arranged in this treatment block.

It can further be provided that the second treatment block and/or the third treatment block comprises a coding device for applying a code to containers.

By providing appropriate coding devices, it is possible to track the containers through the container treatment system, even if the containers are transported without any order in the mass conveyor and therefore in the region of a buffer for the container treatment system. If a coding device is arranged in the first as well as in the third treatment blocks, this allows precise tracking of where each container was treated in the first and third treatment blocks, despite the possible mixing of the containers in the second treatment block.

In one embodiment, no treatment of containers takes place in the region of the first conveying device and/or in the region of the second conveying device. The first and second conveying devices therefore only serve to transport the containers without any treatment of the containers taking place at the same time.

It can further be provided that upstream from the first treatment block, a fourth treatment block is arranged with a wet region and/or temperature control region, comprising a mass conveyor for containers, wherein the fourth treatment block comprises a third single-line container exit point, and the first treatment block comprises a third container feed point, wherein the third single-line container exit point is connected to the third single-line container feed point by a third single-line conveying device.

The wet region and/or temperature control region with the mass conveyor can also serve as a buffer here to compensate for a failure of the downstream first treatment block.

In particular, the fourth treatment block may comprise a container washing machine. Since the treatment of the containers in a container washing machine is not time-critical, a longer residence time and therefore a buffer effect of the container washing machine is possible without adversely affecting the containers in order to compensate for any failure of downstream container treatment machines.

It can further be provided that the third single-line container exit point, the third conveying device and the third single-line container feed point are designed for the single-line transport of containers in at least two vertical transport routes. This allows the throughput rate of containers in the single-line transport systems to be increased.

In one embodiment, the fourth treatment block and/or the second treatment block comprise a buffer region for the random buffering of containers outside the wet region and/or temperature control region and downstream from the container feed point of the treatment block and upstream from the container exit point of the treatment block.

By providing external buffer regions, an excessively long treatment of the containers can be avoided.

According to the invention, an assortment of container treatment systems is also provided, wherein each of the container treatment systems comprises a container treatment system according to one of the preceding embodiments, and wherein for two different container treatment systems of the assortment of container treatment systems, the first single-line conveying device and/or the second single-line conveying device and/or the third single-line conveying device have different forms.

Advantageously, it is possible for the container treatment systems to only vary with regard to the design of the conveying devices. This makes it possible to configure different container treatment systems to spatial conditions without having to change the individual treatment blocks significantly.

In particular, it can accordingly be provided that, for two different container treatment systems in the assortment of container treatment systems, the treatment blocks are designed substantially the same.

With this design, a flexible adaptation of the container treatment system to different spatial conditions is also made possible without requiring a fundamentally new design of the entire system, including the treatment blocks.

It can also be provided that, for two different container treatment systems in the assortment of container treatment systems, the treatment blocks are designed substantially the same. The fact that the treatment blocks are designed substantially the same means in particular that they differ, if at all, only with regard to the container feed point and/or the container exit point, for example the position or orientation of the container feed point and/or the container exit point. Since these elements can be designed as a modular part of a treatment block, even changing these elements does not call for a fundamentally new design of the treatment block itself, which increases flexibility in providing a container treatment system to different spatial conditions, but at the same time reduces the effort involved in designing the container treatment systems.

Furthermore, a method for treating containers such as bottles is provided, wherein the containers are treated in a container treatment system according to one of the preceding embodiments, and at least one treatment step of the containers is carried out in the first treatment block, the second treatment block and the third treatment block.

DETAILED DESCRIPTION

Figure 1:
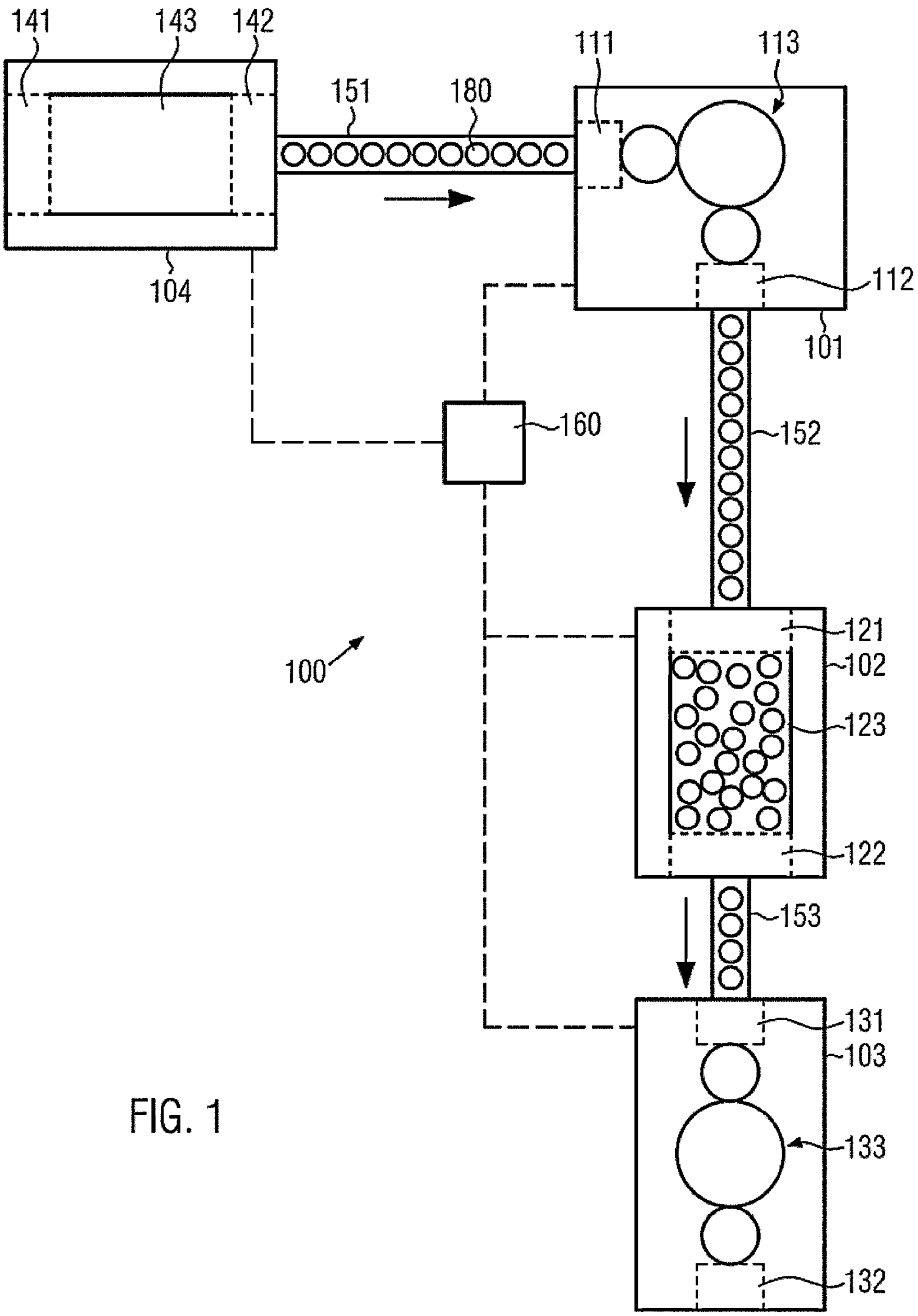
FIG. 1 shows a schematic representation of a container treatment system according to one embodiment.

FIG. 1 shows a schematic view of a container treatment system 100 for treating containers 180 such as bottles, cans or the like according to an embodiment. In the view shown in FIG. 1, the container treatment system comprises a first treatment block 101 and, downstream in the transport direction of the containers 180 of the first treatment block, a second treatment block 102 and, downstream in the transport direction of the containers 180 of the second treatment block 102, a third treatment block 103.

Each of these treatment blocks 101 to 103 comprises at least one container treatment machine which can carry out a treatment step on the containers. Treating containers includes any action carried out on the containers, in particular filling, closing or cleaning, as well as heating or cooling or applying a liquid, but also equipping the containers with decorative elements such as labels or printed images. Inspecting the containers can also be understood as treating the containers. Likewise, the application of a code or other identification marking, for example to track individual containers through the treatment system, as well as reading such a code can be understood as treatment of the containers. In particular as part of the first and/or third treatment blocks 101 and 103, a coding device for applying a code to the containers, and/or a reading device for reading such a code, and/or an inspection device for inspecting the containers can thus also be provided.

The first treatment block 101 can thus comprise at least one container treatment machine in the form of a carousel 113, indicated here schematically, along the periphery of which a plurality of container receptacles and/or treatment stations for treating the containers are arranged (not shown in detail here). The treatment machine can be designed in particular as a filler or capper or a combined filler-capper-treatment machine. The first treatment block 101 can also comprise container treatment machines arranged one after the other (in the transport direction of the containers), wherein each of these machines can be designed as a carousel and/or as a linearly operating machine. For example, a filler can be designed as a linearly operating machine and a subsequent capper can be implemented as a rotary machine.

The second treatment block 102 comprises a wet region and/or temperature control region 123. This is designed to comprise as a mass conveyor so that the containers are transported in an unordered manner in the region of the wet region and/or temperature control region 123. The mass conveyor can have a length of a plurality of meters (for example 5 m or 10 m or more) and can be designed as a conveyor belt or transport belt on which containers are guided through the wet region and/or temperature control region 123. The conveyor belt can in particular have a width transverse to the transport direction of the containers 180 in the region 123 which is a multiple of the diameter of a container, so that a plurality of containers can be transported next to one another and in an unordered manner.

Preferably, the wet region and/or temperature control region can be designed as a pasteurizer and realize heating and/or cooling of the containers 180 guided through the wet region and/or temperature control region 123 either by radiation and/or air or by exposure to a liquid medium (for example water).

The second treatment block 102 can further preferably comprise a blower downstream from the wet region and/or temperature control region, which can cause the containers to dry if the containers were exposed to a liquid in the wet region and/or temperature control region 123.

The third treatment block 103 can then comprise one or more decoration devices and/or inspection devices. These can also be designed, as shown here, as one or more carousels 133, along the periphery of which container receptacles and/or container treatment stations are arranged in order to carry out the respective treatment step. For example, given a design of the treatment block 103 as a labeling machine comprising a carousel 133 with container receptacles, it can be provided to arrange fixed labeling units along its periphery in order to apply the labels to the containers transported in the carousel. Alternatively or additionally, a printing machine, in particular a direct printing machine, can also be provided as part of the third treatment block 103. This can, for example, include co-rotating print heads (i.e., arranged on the carousel) or fixed print heads that apply printing ink to the containers.

Optionally, a fourth treatment block 104 can be arranged upstream from the first treatment block 101, which can comprise a mass conveyor 143 as part of a wet region and/or temperature control region 143. The fourth treatment block 104 can in particular comprise a container washing machine as a realization of the wet region and/or temperature control region 143. Analogous to the second treatment block 102, it can also be provided here that a blower is arranged downstream from the wet region and/or temperature control region 143, which carries out drying of the containers.

According to the invention, single-line conveying devices for single-line transport of the containers between the individual treatment blocks are arranged between the respective treatment blocks. A first single-line conveying device 152 is thus arranged between the first treatment block 101 and the second treatment block 102. A second single-line conveying device 153 is arranged between the second treatment block 102 and the third treatment block 103, and a third single-line conveying device 151 can be arranged between the optionally provided fourth treatment block 104 and the first treatment block 101.

The conveying devices 151, 152 and 153 can in particular be designed as conveyor belts which transport containers one after the other in only one line (seen transversely to the transport direction of the containers in the respective conveying device). Alternatively or additionally thereto, one or more of the conveying devices can also be designed as air conveyors in which the containers are arranged hanging on the support ring in a guide channel and are transported in the transport direction by an air flow:

The first treatment block 101 further comprises a first container exit point 112 which transfers containers from the treatment block 101 to the first single-line conveying device 152. Here, for example, a suitable transfer of the containers from a transportation by neck handling or from a transportation in corresponding container receptacles within the first treatment block 101 to the single-line first conveying device 151 can take place. Corresponding means are known from the prior art.

The second treatment block 102 comprises a first container feed point 121 via which the containers from the first single-line conveying device 152 are transferred to the second treatment block 102. This first container feed point 121 can comprise one or more guide elements or gates in order to distribute the containers from the single-line transport to the mass conveyor. For example, guide gates can be used for this which fan out in the transport direction of the containers so that an unordered mass transportation or a corresponding handover to the mass conveyor is ensured as far as possible across the entire width of the mass conveyor.

The second treatment block 102 further comprises, downstream from the wet region and/or temperature control region 123, a second container exit point 122 which transfers the containers from the mass conveyor to a downstream second single-line conveying device 153. For this purpose, the second container exit point 122 can be designed "inversely" to the first container feed point 121, so that it separates into singles the containers from the initially unordered transportation in the mass conveyor 123 and causes a transfer to the second single-line conveying device. For this purpose, suitable guide gates can also be provided which accommodate the containers in a plurality of lines, which are then brought together to ensure transportation in just one line.

In one embodiment, it can be provided that the first container feed point 121 and/or the second container exit point 122 comprise buffer regions not shown in detail here, which can basically be designed as standing surfaces or conveyor belts and can be used as buffers if container treatment is interrupted downstream or upstream from the second treatment block (for example due to a malfunction). It is then possible to block the second container exit point and to buffer the incoming containers in the buffer region but also in the mass conveyor until they have reached their respective capacity limit. It can be provided that the buffer regions assigned to the first container feed point 121 and/or the second container exit point 122 can accommodate up to 10,000 or up to 20,000 containers or more.

The second single-line conveying device 153 then feeds the containers to the third treatment block 103, wherein this comprises a second container feed point 131 at which the containers can be taken by the second single-line conveying device 152 and fed to a container treatment machine of the third treatment block 103. Here, for example, the containers transported in the conveyor belt of the second single-line conveying device 152 can be transferred to neck handling (for example by arranging a rotating star and a locking device for successively feeding the containers to the rotating star). Following this, a transfer to the actual container treatment machines in the third treatment block 103 can take place.

The third treatment block 103 can further comprise a container exit point 132, via which containers can, for example, be fed to further container treatment machines or further processed as packaged pallets. However, this is not essential for the invention.

If a fourth treatment block 104 is provided, it comprises a third container exit point 142, via which containers can be fed to a third single-line conveying device 151. Analogous to the second container exit point 122 of the second treatment block 102, this can also cause containers from the mass conveyor 143 to be separated into singles via suitable gates before being transferred to the third single-line conveying device 151.

If a fourth treatment block 104 is provided, the first treatment block 101 further comprises a third container feed point 111 via which containers from the third single-line conveying device 153 can be fed to the first treatment block 101 and in particular to a container treatment machine of this treatment block. Here, corresponding to the embodiments already described above, the containers can be suitably separated into singles or the containers can be spaced apart, for example by means of rotating stars and/or locking devices, in order to then feed them to the respective container processing machines.

The fourth treatment block 104 may further comprise a container feed point 141 via which containers can be fed to the fourth treatment block 104. The container feed point can be designed analogously to the embodiments described so far.

The first treatment block 101 and/or the third treatment block 103 can also comprise a lane divider in the respective container feed point, which causes a division of the containers from the single-line transport into a plurality of lanes in which the containers are however transported in an ordered manner and in a line one behind the other. From these lanes, the containers can then be fed to container processing machines. For example, each lane can lead to a different labeling machine. The throughput rate of treatment blocks 101 and 103 can thus be increased.

Furthermore, a control device 160 is shown in FIG. 1 which is connected to each of the provided treatment blocks 101, 102, 103 and 104, preferably for bidirectional data exchange. In addition, the control unit 160 can also preferably be connected to the respective single-line conveying devices for bidirectional data exchange. The control unit can be designed as a control unit of the container treatment system and control all components of the container treatment system. Alternatively or additionally, each of the treatment blocks 101 to 104 can be assigned a respective control unit which can take over the control of the functions of the treatment blocks. The control units can in particular be designed as computers.

Figure 2A:
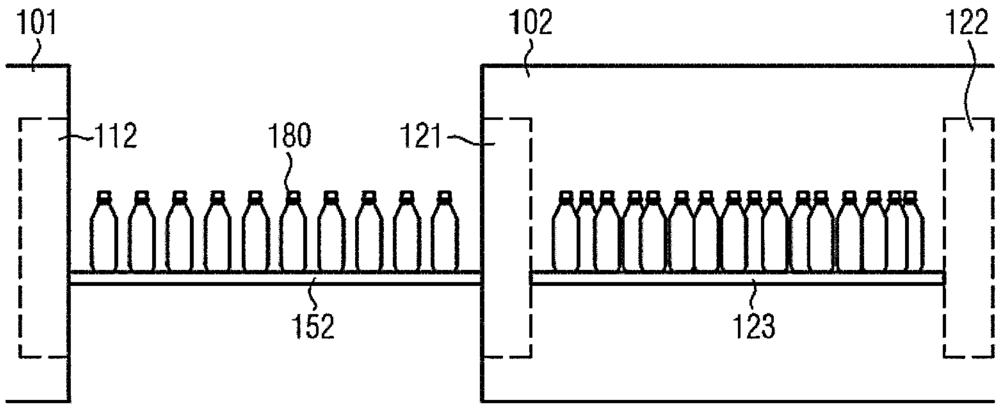
FIGS. 2*a* and *b* show schematic embodiments of container transportation in the conveying devices and the treatment blocks.
Figure 2B:
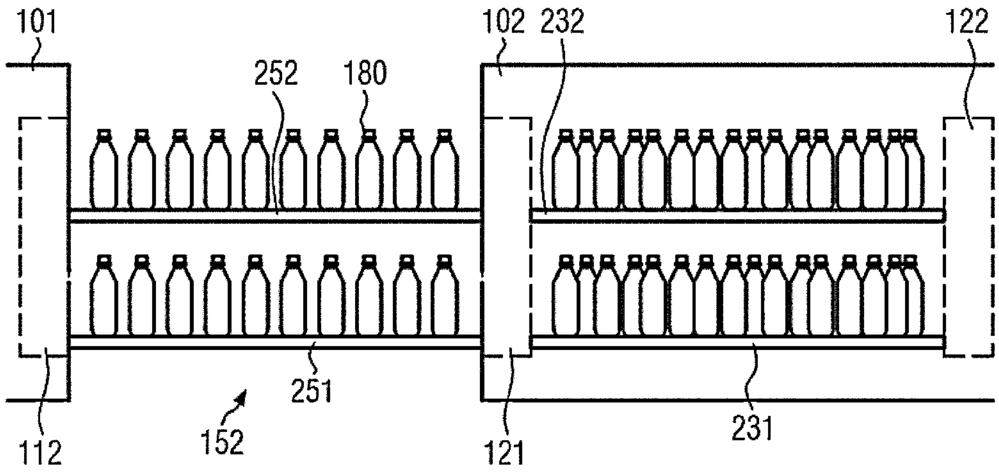

FIGS. 2*a* and 2*b* show different embodiments of treatment blocks arranged one after the other, wherein at least one of the treatment blocks has a mass conveyor. The first treatment block 101 and the second treatment block 102, which comprises a mass conveyor, are therefore shown as examples in FIGS. 2*a* and 2*b*.

In FIG. 2*a*, the transportation from the first treatment block 101 to the second treatment block 102 takes place via the single-line conveying device 152 in which the containers 180 are transported in a single line. At the first container feed point 121, the containers from the single-line conveying device are then divided, as described with reference to FIG. 1, for example via suitable gates, so that they can be fed to the mass conveyor 123 preferably over its entire width.

Here it is preferred if the mass conveyor 123 is moved more slowly than the transport speed of the containers 180 in the first single-line conveying device so that the capacity of the mass conveyor 123 is utilized as fully as possible. In particular, the transport speed of the containers in the mass conveyor can correspond to the reciprocal value of the maximum number of transported containers across the width of the mass conveyor perpendicular to the transport direction of the containers in the mass conveyor 123 multiplied by the transport speed of the containers in the first single-line conveying device 152. For example, if ten containers can be transported across the width of the mass conveyor perpendicular to the transport direction of the containers in the mass conveyor, the transport speed of the containers in the mass conveyor 123 can correspond to approximately one tenth of the transport speed of the containers in the conveying device 152. A lower belt occupancy in the conveying device of the mass conveyor is also conceivable.

Furthermore, the transport speed of the containers in the mass conveyor can also correspond to the reciprocal value of the maximum possible average occupancy per line under the assumption of the densest packing of the bottles multiplied by the transport speed of the containers in the first single-line conveyor 152. Theoretically, this densest packing is hexagonal packing, wherein one line of bottles is offset from the adjacent line by half the diameter of the bottles perpendicular to the transport direction. This tight packing is often not achieved perfectly, but only to a certain percentage. If, during operation, the mass conveyor can be occupied with, for example, 90% or 97.5% of the densest possible packing, this value can be used to determine the transport speed in the single-line conveying device.

It can also be provided that the transport speed of the containers in the mass conveyor 123 is used as a guide value since the transport speed of the containers in the mass conveyor 123, if this is implemented as part of a pasteurizer, for example, is substantially determined by the treatment time required for that pasteurization of the products or by the residence time of the containers in the pasteurizer.

FIG. 2*b* shows an alternative embodiment to FIG. 2*a* in which the transportation of the containers in the first single-line conveying device takes place via two transport routes 251 and 252 arranged at a vertical distance from one another, which together form the single-line conveying device 152. These transport containers 180 are on different levels so that the throughput rate of containers that can be conveyed with the second single-line conveying device 152 can be increased.

In this embodiment, it can be provided that the containers in the first treatment block 101 are treated only on one level. For example, a carousel can only contain one level of container receptacles. In order to distribute the containers onto the transport routes 251 and 252, suitable guide devices can be used to divide the containers. For example, it can be provided that the container treatment takes place in the first treatment block at the height of the transport route 252, and the containers 180 are transferred from this height to a lower height corresponding to the transport route 251 and fed to this by a suitable vertical guide device. This can be done, for example, by suitable transport stars, wherein every second container can be fed to the second transport route 251 and the other containers to the first transport route 252. For example, the transport star can have lowering elements that make individual lowering of the containers possible.

In the embodiment shown in FIG. 2*b*, the second treatment block is designed such that the mass conveyor comprises two mass conveyors 231 and 232, each at the level of the transport route 251 and 252, respectively.

The first container feed point 121 is then preferably designed such that it can implement a distribution of the containers transported in a single line in the respective transport routes 251 and 252 to the respective mass conveyors 231 and 232.

Alternatively to this, it can be provided that in the second treatment block 102 according to FIG. 2*a*, the mass conveyor transports containers only on one level. In this embodiment, it can then be provided that the first container feed point 121 allows transference of the containers, for example, from the transport route 252 to the height of the mass conveyor 231. This can be implemented analogously to the first container exit point 112 by suitable rotating stars which make possible a lowering of all containers arriving on the transport route 252. This can be designed in such a way that two independent gates are arranged at the level of, but upstream from, the mass conveyor 231, which gates ensure distribution of the containers onto the mass flow 231 so that there are no accidental collisions between containers. The first arrangement of gates can distribute the containers of the transport route 251 at a constant height. The second arrangement of gates can distribute the containers lowered from the transport route 252 before they are fed to the mass conveyor 231 with the other containers.

At the second container exit point 122, depending on the downstream single-line conveying device (not shown here), the containers can be arranged either on just one transport level or on two transport levels.

For example, the containers from the respective mass conveyors 231 and 232 can first be separated again into singles (via corresponding gates) and then transferred to the downstream single-line conveying device by being transferred to corresponding rotating stars with suitable guide devices for lowering or raising the containers.

Figure 3A:
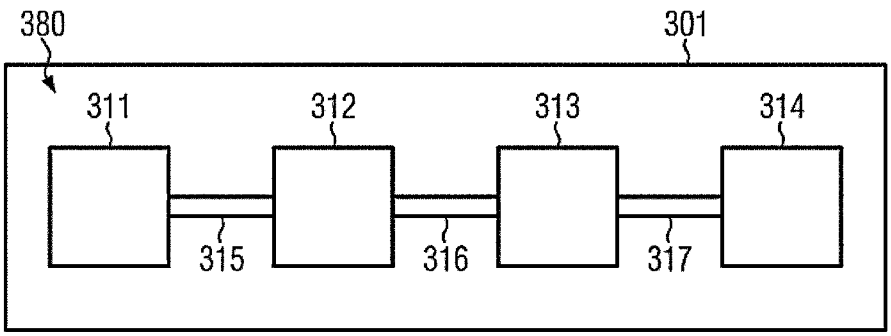
FIG. 3*a* to *c* show different implementations of container treatment systems from an assortment of container treatment systems.
Figure 3B:
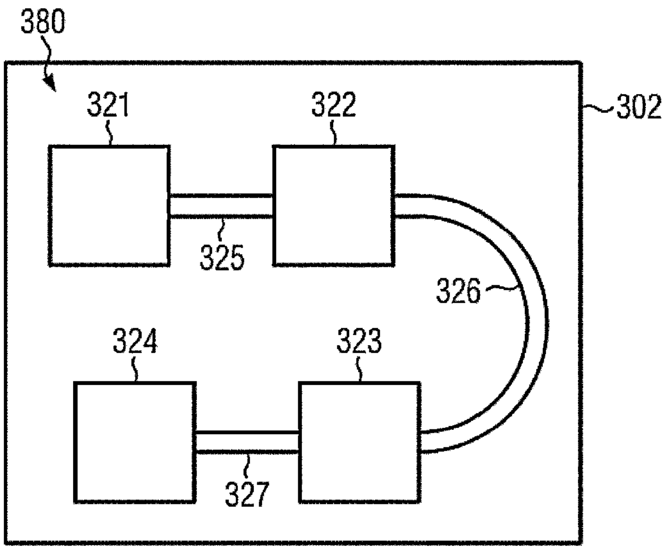
Figure 3C:
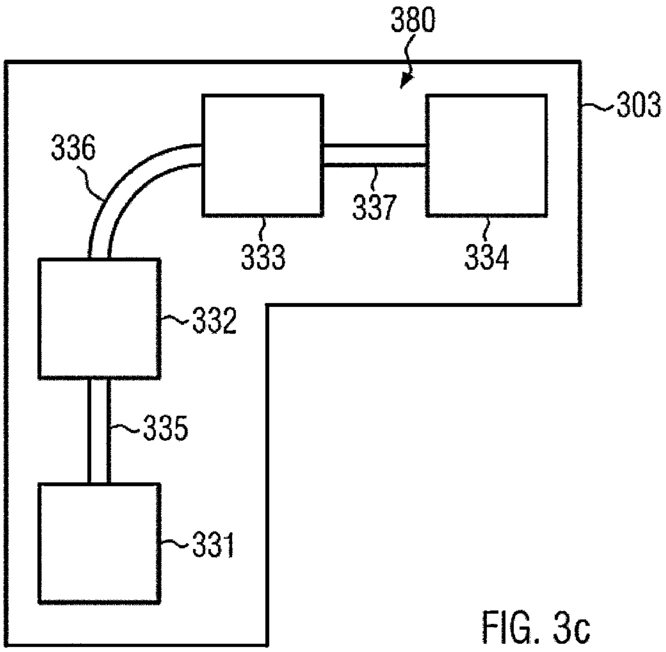

FIGS. 3*a* to 3*c* show different designs of the container treatment system in order to illustrate an assortment of container treatment systems. In FIG. 3*a*, the container treatment system 380 is arranged in a room 301 such as a factory hall which has an elongated shape. To take this into account, the respective treatment blocks 311 to 314 are arranged one after the other in a line in the transport direction of the containers. The single-line conveying devices 315 to 317 extend between them and connect the container exit point of one treatment block to the downstream container feed point of a next treatment block.

Since buffering containers, if necessary, is already realized by the treatment blocks with a mass conveyor, corresponding buffer regions in the single-line conveying devices 315 to 317, which would take up a lot of space, can be avoided. The single-line conveying devices 315 to 317 can be adapted in particular to the space requirements of the room 301, in particular shortened or lengthened, depending on the available space. The treatment blocks 311 to 314 can, however, always be of identical design regardless of the length of the space 301, so that an adaptation to a shorter space in the transport direction of the containers can be achieved by shortening the single-line conveying device when planning the container treatment system 380. However, a structural redesign of the treatment blocks is unnecessary, which facilitates the construction of the container treatment system 380.

It can also be provided that the treatment blocks are always of identical design except for the arrangement of the container feed points and/or exit points, so that by adjusting the single-line conveying devices and the arrangement of the container feed points and exit points, adaptation to spatial conditions is achieved without the treatment blocks themselves having to be changed.

FIG. 3*b* shows another design of the container treatment system 380. Here, the available space 302 is basically rectangular and does not permit, for example, a linear arrangement of the treatment blocks 321 to 324 one after the other, as was the case in FIG. 3*a*. Since the treatment blocks are preferably basically of the same design as the treatment blocks 311 to 314 corresponding to FIG. 3*a*, an adaptation to the spatial conditions can be made by changing the single-line conveying devices 325 to 327, wherein, for example, the single-line conveying device 326 realizes a transportation of the containers along a curve, so that the conveying device of the containers is reversed and space can be saved. Depending on the length and width of the room 302 (e.g., a factory hall), the length and/or curvature of the individual single-line conveying devices can be adjusted if necessary.

As an alternative to the embodiments in FIGS. 3*a* and 3*b*, FIG. 3*c* shows a container treatment system 380 which is to be arranged in a substantially L-shaped space 303. Here too, treatment blocks 331 to 334 are provided which are of substantially identical design to the treatment blocks according to the embodiments in FIGS. 3*a* and 3*b*. An adaptation to the available space 303 can here again be achieved by suitable designs of the single-line conveying devices 335 to 337, whereby here in the conveying device 336 the transport direction is changed by 90° in order to take into account the L-shape of the available space 303.

Since the single-line conveying devices do not have to ensure a buffering effect, they can be selected practically as desired in terms of their length and therefore their container capacity (the maximum number of containers present in the respective single-line conveying device at a given time) in order to allow adaptation to the spatial conditions. The buffering effect is ensured by the treatment blocks themselves, which are basically always of identical design.

With the embodiments presented as examples in FIGS. 3*a* to 3*c*, an assortment of container treatment systems can be realized that can be adapted practically as desired to the available space, for example in a factory hall. This is achieved by adapting the single-line conveying devices for single-line transportation between the treatment blocks, whereas the individual treatment blocks are preferably always of identical design. For container treatment systems in the assortment, minor differences in the treatment blocks can be provided, in particular with regard to the container feed point and/or the container exit point. This concerns in particular transportation on one or more transportation levels but also, for example, the exit angle of the containers from the respective container exit point or the entry angle into the respective container feed point. This depends on the orientation of the conveying devices and can be suitably modified.

However, the container treatment machines within the respective treatment blocks are preferably always of identical design and construction for each container treatment system of such an assortment.

The invention claimed is:

1. A container treatment system for treating containers comprising a first treatment block with a first single-line container exit point, a second treatment block arranged downstream comprising a wet region and/or temperature control region with a mass conveyor for containers, a first single-line container feed point upstream from the mass conveyor, and a second single-line container exit point downstream from the mass conveyor, and a third treatment block arranged downstream from the second treatment block with a second single-line container feed point, wherein the single-line container exit point of the first treatment block is connected to the single-line container feed point of the second treatment block by a first single-line conveying device, and the single-line container exit point of the second treatment block is connected to the single-line container feed point of the third treatment block by a second single-line conveying device, wherein the wet region and/or temperature control region is designed as a pasteurizer.

2. The container treatment system according to claim 1, the second treatment block comprises a blower for blowing off liquid on the surface of the containers.

3. The container treatment system according to claim 1, wherein the first single-line container exit point, the first single-line conveying device and the first single-line container feed point are designed for the single-line transportation of containers in at least two vertical transport routes; and/or wherein the second single-line container exit point, the second conveying device and the second single-line container feed point are designed for the single-line transportation of containers in at least two vertical transport routes.

4. The container treatment system according to claim 1, wherein the first treatment block comprises a filler, and/or a capper, and/or an inspection device for inspecting the containers.

5. The container treatment system according to claim 1, wherein the third treatment block downstream from the second container feed point comprises a lane divider for dividing the containers from the second single-line conveying device into a plurality of lanes, and/or wherein the third treatment block comprises an inspection device for inspecting the containers, and/or wherein the third treatment block comprises a labeling machine and/or a direct printing machine.

6. The container treatment system according to claim 1, wherein the second treatment block and/or the third treatment block comprises a coding device for applying a code to containers.

7. The container treatment system according to claim 1, wherein no treatment of containers takes place in the region of the first conveying device and/or in the region of the second conveying device.

8. The container treatment system according to claim 1, wherein upstream from the first treatment block a fourth treatment block is arranged with a wet region and/or temperature control region, comprising a mass conveyor for containers, wherein the fourth treatment block comprises a third single-line container exit point, and the first treatment block comprises a third container feed point, wherein the third single-line container exit point is connected to the third single-line container feed point by a third single-line conveying device.

9. The container treatment system according to claim 8, wherein the fourth treatment block comprises a container washing machine.

10. The container treatment system according to claim 8, wherein the third single-line container exit point, the third conveying device and the third single-line container feed point are designed for the single-line transportation of containers in at least two vertical transport routes.

11. The container treatment system according to claim 1, wherein the fourth treatment block and/or the second treatment block comprise a buffer region for the random buffering of containers outside the wet region and/or temperature control region and downstream from the container feed point of the treatment block and upstream from the container exit point of the treatment block.

12. An assortment of container treatment systems, wherein each of the container treatment systems comprises a container treatment system according to claim 1, and wherein for two different container treatment systems of the assortment of container treatment systems, the first single-line conveying device, and/or the second single-line conveying device, and/or the third single-line conveying device have different forms.

13. The assortment of container treatment systems according to claim 12, wherein for two different container treatment systems in the assortment of container treatment systems, the treatment blocks are substantially of identical design.

14. A method for treating containers, wherein the containers are treated in a container treatment system according to claim 1, and at least one treatment step of the containers is carried out in the first treatment block, the second treatment block and the third treatment block.

* * * * *